Jan. 9, 1940.   C. F. STANLEY   2,186,686
BEARING MOUNTING
Filed Nov. 10, 1936
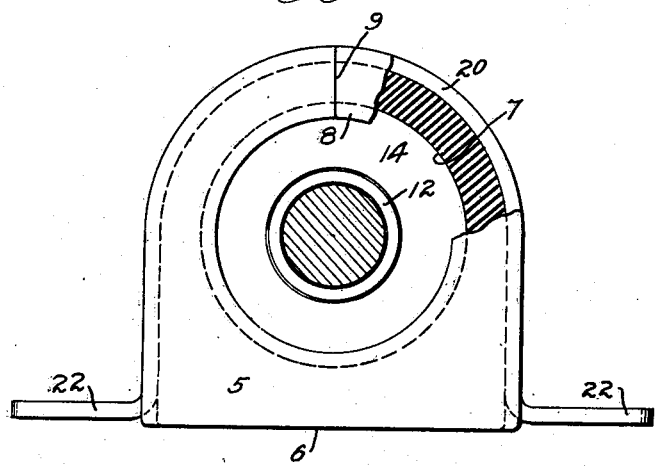
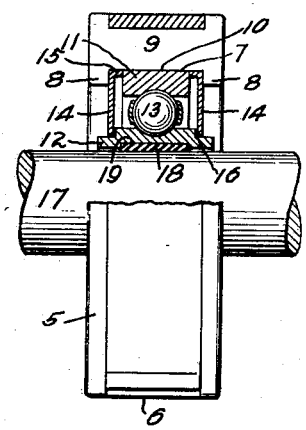
INVENTOR
CHARLES F. STANLEY
BY
ATTORNEYS Patented Jan. 9, 1940

2,186,686

UNITED STATES PATENT OFFICE 2,186,686

BEARING MOUNTING

Charles F. Stanley, New Britain, Conn., assignor to The Fafnir Bearing Company, New Britain, Conn., a corporation of Connecticut Application November 10, 1936, Serial No. 110,075

3 Claims. (Cl. 308—184)

My invention relates to a bearing mounting, particularly of the sound deadening type.

It is the principal object of my invention to provide a sound deadening bearing mounting, together with means to facilitate assembly of a bearing therewith.

Another object is to provide a sound deadening bearing mounting which may be readily assembled and in which the bearing will be securely held in place.

Other objects and various features of invention will be hereinafter pointed out or will become apparent to those skilled in the art.

In the drawing which shows, for illustrative purposes only, a preferred form of the invention—

Fig. 1 is an axial view in elevation of a bearing mounting illustrating features of the invention, a part being broken away for illustration;

Fig. 2 is an edge view in quarter section of the mounting shown in Fig. 1.

In said drawing, 5 indicates a body of sound deadening material, preferably of rubber, which may be natural or synthetic rubber. In the form shown, the block 5 has a flat base to rest upon a framework or support and the block may be said to be of generally semi-circular form. The block is provided with a circular bore 7 for the reception of an anti-friction bearing, to be described. The bore is defined at one edge and preferably at both edges by radially inwardly extending securing walls or flanges 8—8 to prevent axial displacement of the bearing from the housing block 5. The block itself is divided preferably at a single point by a generally radially extending split 9 so that the parts of the block adjacent the split 9 may be separated and thereby enlarge the bore 7 substantially to facilitate the insertion of the bearing and any other parts to be placed within the bore.

The bearing in the preferred form includes an outer bearing ring 11, an inner bearing ring 12, together with interposed anti-friction bearing members such as balls 13, which preferably hold the two rings relatively to each other. The outer ring 11 is of a size to fit the bore quite tightly when the edges of the block adjacent the division 9 are brought substantially together and when the block and bearing are assembled, the bearing will be held in the bore quite securely against turning. In order to seal the bearing against loss of lubricant and entry of foreign matter, I preferably provide seal means which may be at one or both sides of the bearing, depending upon conditions. In the form shown wherein the bore 7 extends completely through the block 5, I provide a seal plate at each side of the bearing. Such seal plate may comprise a generally radially inwardly extending plate portion 14 and an inturned flange portion 15 to abut the edge of the outer bearing ring. The distance between the flanges 8 is such that the outer bearing ring and the seal means will preferably occupy the entire width of the bore 7 and the seal plates will be held securely within the bore and be maintained in proper assembled relation with the bearing. If desired, the inner ring may be rabbeted at the edges, as indicated at 16, to form a better seal. If necessary or desired, the inner ring may be found insulated from a shaft 17 to be received within the bore of the inner ring by means of a body of sound deadening material, such as a rubber annulus 18 fitting within a wide shallow groove 19 in the bore of the inner ring, as will be understood.

After the bearing and seals, when required, are assembled in the bore of the block 5, the edges adjacent the division 9 are brought together or adjacent to each other and are so held to provide for proper assembled relationship between the bearing and the block 5. In the form illustrated I provide a sheet metal strip or housing part 20, which conforms in general to the shape of the block 5 and preferably fits in a groove 21 provided in the outer surface of the block. The ends of the housing strap 20 are provided with outwardly extending foot portions 22-22 which may be apertured for the reception of securing bolts or screws, as will be clear. When the strap is in place and secured to the support upon which the block 5 rests, it will be clear that the bearing will be securely held in the block and that bearing noises will be substantially reduced or eliminated.

It will be seen that by means of my invention a bearing may be very easily assembled with a rubber or other sound deadening block constituting a support for the bearing without unduly stressing the rubber block. Very substantial securing flanges 8—8 may be employed since the flanges need not be distorted in order to permit insertion of the bearing rings. When the bearing is assembled with the rubber block and the block properly secured as by the housing strap 20, the block of sound deadening material will in effect be a solid block the same as if there were no division therein.

While I have illustrated a block of sound deadening material as being divided at only a single point, it is to be understood that the block could be made in two halves and the bearing and seals readily assembled therewith. However, I prefer to provide a unitary block and divide the same at only one point so that the bearing is assembled by opening up the bearing receiving bore by separating the parts of the block adjacent the division.

While the invention has been described in considerable detail and a preferred form illustrated, it is to be understood that changes may be made within the scope of the invention as defined in the appended claims.

I claim:

1. In a bearing mounting, a block of rubber having a bearing receiving opening therein, said block having radially inwardly extending projecting portions at the ends of said bearing receiving opening, a bearing in said bearing receiving opening and including an outer bearing ring fitting within said opening, an inner bearing ring, anti-friction bearing members interposed between said bearing rings, and seal means within said bearing receiving opening and abutting said outer bearing ring, said block of rubber being divided whereby said bearing receiving opening may be enlarged to facilitate assembly of said bearing and seal means therewith, and a housing member for said block of rubber to hold the same in assembled relation with said bearing.

2. In a pillow block, a block of rubber having a flat base to rest upon a support, said block of rubber having a bearing receiving bore therein and integral inwardly directed lips defining said bore at opposite sides of said block, said block being split from the bore to the exterior thereof whereby said bore may be expanded in diameter for receiving a bearing in the bore and between the lips, and securing means engaging a part only of the exterior of said block for urging the parts of said block adjacent the split toward each other, said securing means being secured to said support.

3. In a bearing mounting, a body of rubber having a bearing receiving opening therein, said body of rubber having radially inwardly projecting portions at the ends of said bearing receiving opening and defining the length of said opening, a bearing in said bearing receiving opening and including an outer bearing ring fitting within said opening, an inner bearing ring, anti-friction bearing members interposed between said bearing rings, and a seal means within said bearing receiving opening, said seal means comprising an annular member extending substantially across the space between said bearing rings and held at its outer edge between said outer bearing ring and said radially inwardly projecting portion and in abutting relation with said outer bearing ring and said radially inwardly projecting portion.

CHARLES F. STANLEY.